July 29, 1930.                E. M. WRIGHT                 1,771,475
                STATOR IN ELECTRIC MOTORS AND GENERATORS
                          Filed June 18, 1928
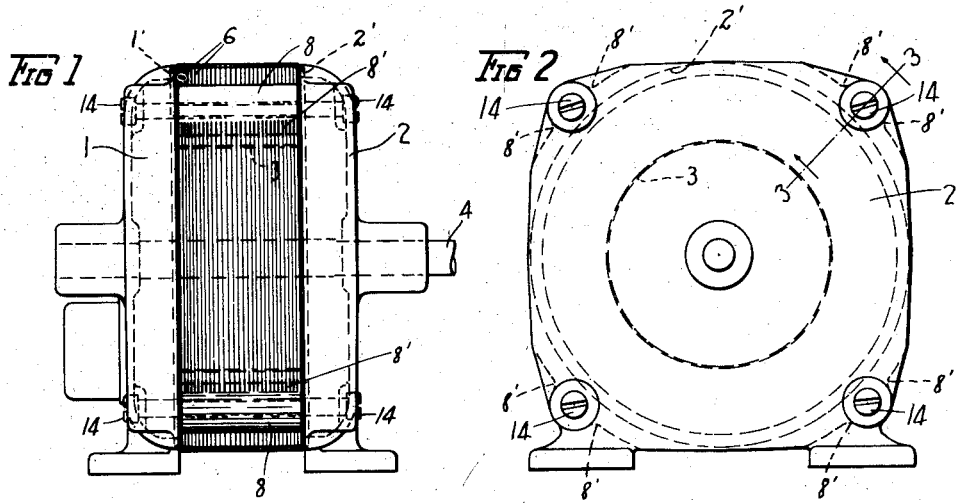
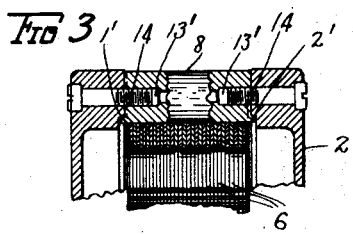
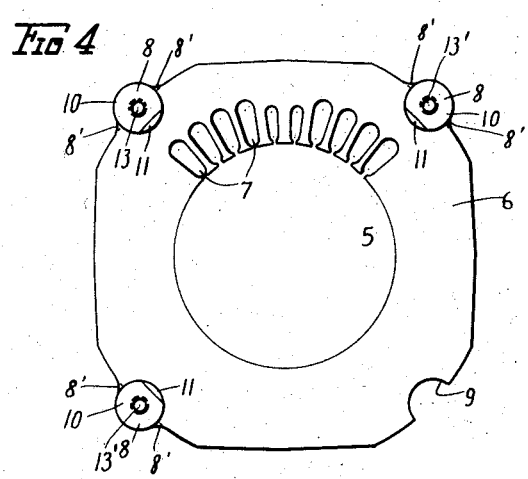
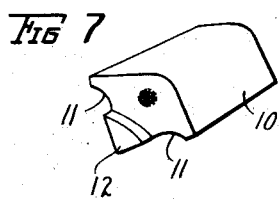
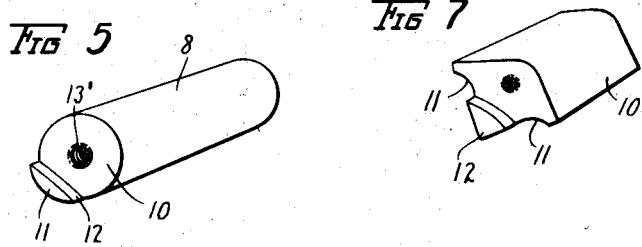
Inventor
Edwin M. Wright
By Staley & **
Attorneys Patented July 29, 1930

1,771,475

UNITED STATES PATENT OFFICE

EDWIN M. WRIGHT, OF SPRINGFIELD, OHIO, ASSIGNOR TO ROBBINS & MYERS, INC., OF SPRINGFIELD, OHIO, A CORPORATION OF OHIO

STATOR IN ELECTRIC MOTORS AND GENERATORS

Application filed June 18, 1928. Serial No. 286,090.

This invention relates to improvements in stators for electric motors and generators, it more particularly relating to a stator of laminated character with improved means for securing the laminations together.

One of the objects of the invention is to provide means for securing together the laminations of a stator in such a way that the securing devices are located outside of the path of the flux to obviate the losses incurred by fastening devices which penetrate the flux path.

A further object of the invention is to provide fastening devices of a character which will allow for machining the faces thereof to which the end brackets or frames are fastened in such a way as to secure the proper concentricity of the armature and consequent uniformity in the air gap.

A further object of the invention is to provide fastening devices for the laminations which will permit maximum results with a minimum amount of material used for the laminations.

Other objects will appear from the accompanying description and claims.

In the accompanying drawings:

Fig. 1 is an elevation of a motor or generator in which my improvements are embodied.

Fig. 2 is en end elevation of the same.

Fig. 3 is a section on the line 3—3 of Fig. 2.

Fig. 4 is an end view of the field ring or core with one of the fastening bars omitted.

Fig. 5 is an enlarged view in perspective of a detail of the new construction.

Fig. 6 is a fragmentary end view, in which a modification is illustrated.

Fig. 7 is an enlarged perspective view of a detail of the modification shown in Fig. 6.

Referring to Fig. 1, 1 and 2 are the heads or end brackets of an electric motor or generator of any well-known type, supporting the rotor or armature 3 on the shaft 4. The element known as the field ring or core of the stator is indicated in general by 5, and consists of a plurality of laminations 6, having the usual wire-slots 7 in which the field windings (not shown) are inserted. These laminations are secured together by metallic bars 8 which are located at the corners of the laminations and may be imbedded to some degree in the laminations or not at all. In Figs. 1 to 5 inclusive is shown an arrangement in which the connecting bars 8 are located in grooves at the corners formed by notching each lamination as indicated at 9 in Fig. 4, the bars being secured in the grooves by a method and means involving the application of heat such as by welding or brazing, preferably welding, as indicated at 8'. The notches 9 are uniformly placed in the respective laminations so that the bars 8 will be located at a uniform distance from the center of the core.

The bars 8 are preferably slightly longer than the width of the stack of laminations so that each end will project slightly beyond the field core. In order to concentrically support the heads 1 and 2, and thus carry the rotor in the center of the field, the ends of the rods 8 are then machined so that the major flat end portions 10 of the ends of the rods are in parallel planes. A projection or lug 11 is left, having a surface 12, and as to a plurality of such surfaces it is preferable that they be in a circular plane concentric to the axis of the rotor.

The usual practice in machining the heads may be followed, there being bores 1' and 2', whose diameters are substantially equal to the diameter of the circular plane wherein are the surfaces 12. Therefore when the heads are placed in position on the lugs 11, they are both in concentric and parallel alignment, one with the other. In each end of the rods 8 are threaded holes 13', into which the screws 14 securing the heads to the field-ring are inserted.

In Figs. 6 and 7 is shown a modification in the form of the connecting bar in which the bar indicated at 10 is shown somewhat triangular in form with its long face preferably provided with recesses 11 and a central pointed rib 12 fitted to corresponding surfaces in the corners of the laminations. the ends of the ribs 12 being extended as shown to provide a seat for the heads as explained in connection with the bars 8. These bars 10 are welded or brazed in position, preferably welded, as indicated at 13.

By this arrangement it will be seen that the connecting bars are located well out of the path of the flux so as to eliminate the losses incurred when rivets or other fastening devices penetrate the laminations in the path of the flux. Also the arrangement allows for machining the faces of the bars so as to provide concentric seats for the heads or end brackets. Also, the arrangement results in a substantial saving of material, as by utilizing the corners of the laminations for the securing bars as described. the outside dimensions of the laminations may be materially reduced.

Having thus described my invention, I claim:

1. In a stator, a ring formed of a series of laminations placed side by side, and a series of bars integrally united to said laminations adjacent the edges thereof and at least partly outside of the boundaries thereof. each bar having each end provided with a surface concentric to the axis of the ring to receive the end brackets of a generator or motor.

2. In a stator, a series of laminations forming a ring, each provided with a series of uniform notches at its edge to provide a series of grooves extending throughout the thickness of the core. and a metal bar in each of said grooves integrally united to the laminations. each bar having each end provided with a surface concentric to the axis of the core to receive the end brackets of a generator or motor.

3. In a stator, a series of metal plates forming field laminations, each plate being notched at its four corners to provide corner grooves extending throughout the thickness of the core. and a series of bars in said grooves and integrally united to the plates, each bar having each end provided with a surface concentric to the axis of the core to receive the end brackets of a generator or motor.

4. In a machine of the character described, a stator comprising a series of metal plates, and metal bars secured adjacent the outer edges of said plates for securing said plates together. end brackets for supporting an armature and its shaft, each of said bars having a projection at each end thereof provided with a surface to receive said end brackets, all the surfaces at each end of the machine being formed on the arc of a circle whose center is the axis of said shaft.

5. In a stator, a ring formed of a series of laminations placed side-by-side, and a series of bars integrally united to said laminations adjacent the edges thereof, a plurality at least of said bars each being provided with a surface to receive the end bracket of a generator or motor and position the bore of the same concentric to the axis of the ring.

In testimony whereof. I have hereunto set my hand this 15th day of June, 1928.

EDWIN M. WRIGHT.